(12) United States Patent
Arakawa et al.

(10) Patent No.: US 12,522,514 B2
(45) Date of Patent: Jan. 13, 2026

(54) METHOD FOR PRODUCING MIXED METAL SALT

(71) Applicant: JX METALS CIRCULAR SOLUTIONS CO., LTD., Tokyo (JP)

(72) Inventors: Junichi Arakawa, Hitachi (JP); Kazunori Tajiri, Hitachi (JP)

(73) Assignee: JX METALS CIRCULAR SOLUTIONS CO., LTD., Tokyo (JP)

( * ) Notice: Subject to any disclaimer, the term of this patent is extended or adjusted under 35 U.S.C. 154(b) by 521 days.

(21) Appl. No.: 17/918,307

(22) PCT Filed: Apr. 22, 2021

(86) PCT No.: PCT/JP2021/016381
§ 371 (c)(1),
(2) Date: Feb. 16, 2023

(87) PCT Pub. No.: WO2021/215521
PCT Pub. Date: Oct. 28, 2021

(65) Prior Publication Data
US 2023/0312369 A1    Oct. 5, 2023

(30) Foreign Application Priority Data

Apr. 23, 2020   (JP) ................. 2020-076947

(51) Int. Cl.
*C01G 53/40* (2025.01)
*B01D 11/04* (2006.01)
(Continued)

(52) U.S. Cl.
CPC .......... *C01G 53/40* (2013.01); *B01D 11/0492* (2013.01); *B09B 3/35* (2022.01); *H01M 10/54* (2013.01); *C01P 2002/50* (2013.01)

(58) Field of Classification Search
CPC ........ C01G 53/40; C01G 53/44; C01G 53/50; C01G 53/51; B01D 11/0492; H01M 10/54
(Continued)

(56) References Cited

U.S. PATENT DOCUMENTS 10,400,304 B2 *  9/2019  Adachi ............. H01M 10/0525
10,443,111 B2 * 10/2019  Arakawa ................ C22B 7/007
(Continued)

FOREIGN PATENT DOCUMENTS

CA    3 058 572 A1    10/2018
CN    103199320 A     7/2013
(Continued)

OTHER PUBLICATIONS

Extended European Search Report for corresponding European Application No. 21791969.5, dated Apr. 4, 2024.
(Continued)

*Primary Examiner* — Cam N. Nguyen
(74) *Attorney, Agent, or Firm* — Birch, Stewart, Kolasch & Birch, LLP

(57) ABSTRACT

A method for producing mixed metal salts containing manganese ions and at least one of cobalt ions and nickel ions, the method including: an Al removal step of subjecting an acidic solution containing at least manganese ions and aluminum ions, and at least one of cobalt ions and nickel ions, to removal of the aluminum ions by extracting the aluminum ions into a solvent, the acidic solution being obtained by subjecting battery powder of lithium ion batteries to a leaching step; and a precipitation step of neutralizing an extracted residual liquid obtained in the Al removal step under conditions where a pH is less than 10.0, to
(Continued)

precipitate mixed metal salts comprising a metal salt of manganese and a metal salt of at least one of cobalt and nickel.

6 Claims, 2 Drawing Sheets

(51) Int. Cl.
*B09B 3/35* (2022.01)
*C01G 53/44* (2025.01)
*C01G 53/50* (2025.01)
*C01G 53/51* (2025.01)
*H01M 10/54* (2006.01)

(58) Field of Classification Search
USPC .......................................................... 423/50
See application file for complete search history.

(56) References Cited

U.S. PATENT DOCUMENTS

| | | | |
|---|---|---|---|
| 10,577,255 B2* | 3/2020 | Ohara | C01G 51/10 |
| 10,807,879 B2* | 10/2020 | Ito | C22B 3/30 |
| 10,865,462 B2* | 12/2020 | Ito | B09B 3/80 |
| 11,702,719 B2* | 7/2023 | Arakawa | C22B 3/04 |
| | | | 75/419 |
| 11,961,980 B2* | 4/2024 | Arakawa | B09B 5/00 |
| 12,000,018 B2* | 6/2024 | Higaki | C22B 23/043 |
| 2008/0038168 A1 | 2/2008 | Cheng et al. | |
| 2018/0087127 A1 | 3/2018 | Adachi et al. | |
| 2019/0084839 A1* | 3/2019 | Ito | C01G 45/01 |
| 2019/0106768 A1* | 4/2019 | Ito | C22B 3/3846 |
| 2020/0044295 A1* | 2/2020 | Arakawa | B09B 5/00 |
| 2022/0136084 A1 | 5/2022 | Rohde et al. | |

FOREIGN PATENT DOCUMENTS

| | | |
|---|---|---|
| CN | 105789726 A | 7/2016 |
| CN | 107732352 A | 2/2018 |
| CN | 110512080 A | 11/2019 |
| JP | 2012-211386 A | 11/2012 |
| JP | 2013-152854 A | 8/2013 |
| JP | 2014-162982 A | 9/2014 |
| JP | 2016-186113 A | 10/2016 |
| JP | 2016-186118 A | 10/2016 |
| JP | 2016-194105 A | 11/2016 |
| WO | WO 2005/073415 A1 | 8/2005 |
| WO | WO 2016/159002 A1 | 10/2016 |
| WO | WO 2019/121086 A1 | 6/2019 |

OTHER PUBLICATIONS

International Search Report for PCT/JP2021/016381 (PCT/ISA/210) mailed on Jun. 29, 2021.
International Preliminary Report on Patentability and English translation of the Written Opinion of the International Searching Authority (Forms PCT/IB/338, PCT/IB/373, and PCT/ISA/237) for International Application No. PCT/JP2021/016381, dated Nov. 3, 2022.
International Preliminary Report on Patentability and English translation of the Written Opinion of the International Searching Authority (Forms PCT/IB/338, PCT/IB/373, and PCT/ISA/237) for International Application No. PCT/JP2021/016380, dated Nov. 3, 2022.
International Search Report for PCT/JP2021/016380 (PCT/ISA/210) mailed on Jul. 6, 2021.
U.S. Office Action for U.S. Appl. No. 17/917,520, dated May 8, 2025.

* cited by examiner

METHOD FOR PRODUCING MIXED METAL SALT

FIELD OF THE INVENTION

This specification discloses techniques relating to a method for producing mixed metal salts.

BACKGROUND OF THE INVENTION

In recent years, it has been widely studied for recovery of valuable metals such as cobalt and nickel from lithium ion battery waste containing cathode materials for lithium ion batteries discarded for expired product life, manufacturing defects or other reasons by means of a wet process or the like, in terms of effective utilization of resources.

For example, in a process for recovering valuable metals from lithium ion battery waste, battery powder and the like obtained through a roasting step and other steps is typically added to an acid to be leached, resulting in a leached solution in which cobalt, nickel, manganese, iron, aluminum and the like that may be contained therein are dissolved.

Subsequently, iron and the like are separated and removed from the leached solution, and the respective metal ions in the solution are separated by solvent extraction at multiple stages. More particularly, in the solvent extraction at multiple stages, manganese ions and aluminum ions are first extracted into a solvent and removed. The cobalt ions are then extracted and back-extracted, and the nickel ions are then extracted and back-extracted. A solution containing cobalt ions and a solution containing nickel ions obtained by each back extraction are subjected to electrolysis, respectively, to recover cobalt and nickel in the form of metals (see, for example, Patent Literature 1).

CITATION LIST

Patent Literature

[Patent Literature 1] Japanese Patent Application Publication No. 2014-162982 A

SUMMARY OF THE INVENTION

Technical Problem

If cobalt, nickel and manganese can be recovered in the form of a metal mixed solution containing two or more metals of those metals dissolved therein and having a relatively high purity, or in the form of mixed metal salts containing two or three of those metals and having a relatively high purity in the metal recovery process as described above, it may be possible to directly use them as raw materials for producing cathode materials for lithium ion batteries. For example, when a relatively high-purity metal mixed solution in which three metals of cobalt, nickel and manganese are dissolved or relatively high-purity mixed metal salts containing each metal salt of the three metals is/are obtained, it would be possible to use them as raw materials for producing ternary cathode materials for lithium ion batteries. In this case, the above process such as electrolysis can be omitted, and simplification of the step and significant reduction in cost can be expected.

To produce such mixed metal salts, it is necessary to remove aluminum ions from an acidic solution containing cobalt and/or nickel ions and manganese ions in addition to the aluminum ions, because, if the aluminum ions are not removed, aluminum may be contained as an impurity in finally produced mixed metal salts, resulting in a decrease in purity.

Moreover, if solvent extraction is further carried out after aluminum is removed, a pH adjusting agent such as an alkali will be used to adjust the pH during extraction. In some cases, the pH adjusting agent may also be used during the subsequent precipitation of the mixed metal salts, and the use of the pH adjusting agent over multiple stages leads to an increase in cost.

This specification discloses a method for producing mixed metal salts which can produce mixed metal salts having relatively high purity while suppressing the use of the pH adjusting agent to suppress an increase in cost.

Solution to Problem

A method for producing mixed metal salts disclosed in this specification is a method for producing mixed metal salts comprising manganese ions and at least one of cobalt ions and nickel ions, the method comprising: an Al removal step of subjecting an acidic solution comprising at least manganese ions and aluminum ions, and at least one of cobalt ions and nickel ions, to removal of the aluminum ions by extracting the aluminum ions into a solvent, the acidic solution being obtained by subjecting battery powder of lithium ion batteries to a leaching step; and a precipitation step of neutralizing an extracted residual liquid obtained in the Al removal step under conditions where a pH is less than 10.0, to precipitate mixed metal salts comprising a metal salt of manganese and a metal salt of at least one of cobalt and nickel.

Advantageous Effects of Invention

According to the method for producing the method for producing the mixed metal salts, mixed metal salts having relatively high purity can be produced while suppressing the use of the pH adjusting agent to suppress an increase in cost.

DETAILED DESCRIPTION OF THE INVENTION

Hereinafter, embodiments of the method for producing the mixed metal salts will be described in detail.

The method for producing the mixed metal salts according an embodiment is a method for producing mixed metal salts containing manganese ions and at least one of cobalt ions and nickel ions, the method including: an Al removal step of subjecting an acidic solution containing at least manganese ions and aluminum ions, and at least one of cobalt ions and nickel ions, to removal of the aluminum ions by extracting the aluminum ions into a solvent, the acidic solution being obtained by subjecting battery powder of lithium ion batteries to a leaching step; and a precipitation step of neutralizing an extracted residual liquid obtained in the Al removal step under conditions where a pH is less than 10.0, to precipitate mixed metal salts comprising a metal salt of manganese and a metal salt of at least one of cobalt and nickel.

Figure 1:
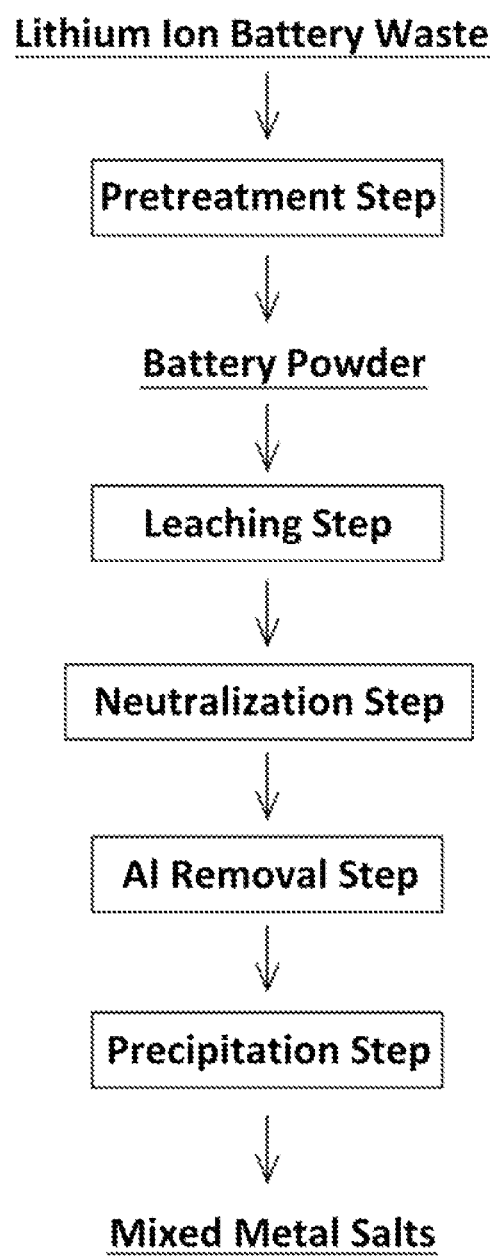
FIG. 1 is a flow chart illustrating an example of a process including a method for producing mixed metal salts according to an embodiment.

This embodiment can be applied, for example, to a metal recovery process from lithium ion battery waste as illustrated in FIG. 1. Here, descriptions will be provided below in accordance with the process of FIG. 1.

(Lithium Ion Batteries)

The lithium ion battery waste of interest is lithium ion secondary batteries containing at least cobalt and/or nickel, and manganese, as cathode active materials, which can be used in various electronic devices such as mobile phones and which have been discarded due to the expired life of the product, manufacturing defects or other reasons. The recovery of valuable metals from such battery waste is preferred in terms of effective utilization of resources. Further, an object herein is to recover valuable metals cobalt and/or nickel and manganese with high purity so that they can be reused for manufacturing lithium ion secondary batteries.

The lithium ion battery waste has a housing containing aluminum as an exterior that wraps around the lithium ion battery waste. Examples of the housing include those made only of aluminum and those containing aluminum, iron, aluminum laminate, and the like. The lithium ion battery waste may also contain, in the above housing, cathode active materials composed of one single metal oxide or two or more composite metal oxides or the like, selected from the group consisting of lithium, nickel, cobalt and manganese, and aluminum foils (cathode substrates) to which the cathode active materials are applied and fixed by, for example, polyvinylidene fluoride (PVDF) or other organic binder. In addition, the lithium ion battery waste may contain copper, iron, or the like. Further, the lithium ion battery waste generally contains an electrolytic solution in the housing. For example, ethylene carbonate, diethyl carbonate or the like may be used as the electrolytic solution.

The lithium ion battery waste is often subjected to a pretreatment step. The pretreatment steps may include a roasting process, a crushing process and a sieving process. Battery powder is thus obtained.

In the roasting process, the above lithium ion battery waste is heated. The roasting process is carried out for the purposes of converting a metal such as lithium and cobalt contained in the lithium ion battery waste to a form of the metal which can be easily dissolved, and the like, for example. In the roasting process, the lithium ion battery waste is preferably heated by maintaining it in a temperature range of from 450° C. to 1000° C., preferably in a temperature range of from 600° C. to 800° C., for 0.5 to 4 hours, for example. The roasting process can be carried out by using various heating equipment such as a rotary kiln furnace or other various furnaces, and a furnace for heating in an air atmosphere.

After the roasting process, a crushing step of removing cathode materials and anode materials from the housing of the lithium ion battery waste is carried out. The crushing process is carried out to selectively separate the cathode active materials from the aluminum foils to which the cathode active materials are applied, while destroying the housing of the lithium ion battery waste.

Various known apparatuses or devices can be used for the crushing process. In particular, it is preferable to use an impact-type crusher that can crush lithium ion battery waste by applying an impact while cutting. Examples of the impact-type crusher include a sample mill, a hammer mill, a pin mill, a wing mill, a tornado mill, and a hammer crusher.

It should be noted that a screen can be installed at an exit of the crusher, whereby the lithium ion battery waste is discharged from the crusher through the screen when crushed to a size that can pass through the screen.

After crushing the lithium ion battery waste in the crushing process, the lithium ion battery waste is sieved using a sieve having an appropriate opening, for example, for the purpose of removing aluminum powder. Thus, aluminum or copper remains on the sieve, and battery powder from which aluminum or copper has been removed to some extent can be obtained under the sieve.

The battery powder contains manganese, and cobalt and/or nickel, for example, the battery powder may contain 0% by mass to 30% by mass of cobalt, 0% by mass to 30% by mass of nickel, and 1% by mass to 30% by mass of manganese. In addition, the battery powder may contain aluminum, iron, copper and the like.

(Leaching Step)

The battery powder is subjected to the leaching step. In the leaching step, the battery powder as described above is added to an acidic solution such as sulfuric acid and leached therein. The acid leaching step can be carried out by a known method or conditions. It is preferable that a pH of the acidic solution is from 0.0 to 2.0, and an oxidation-reduction potential (ORP value, silver/silver chloride potential reference) of the acidic solution is 0 mV or less.

It should be noted that, prior to leaching with the acidic leaching solution, the battery powder may optionally be brought into contact with water in advance so that only lithium contained in the lithium ion battery waste is leached and separated. In this case, the acid leaching is carried out by adding a water leached residue obtained after the battery powder is brought into contact with water to leach lithium, to the above acidic leaching solution.

The acid leaching provides a leached solution having predetermined metals dissolved. The predetermined metals as used herein include cobalt, nickel, manganese, and aluminum. The predetermined metals may also include lithium, iron, and the like. It should be noted that copper which may be contained in the battery powder can be removed by leaving it in the acid leached residue without being dissolved by the acid leaching. In addition, when copper is leached and dissolved in the leached solution, a step of removing copper by electrolysis may be carried out before a neutralization step as described below.

For example, the leached solution may have a cobalt concentration of 0 g/L to 50 g/L, a nickel concentration of 0 g/L to 50 g/L, a manganese concentration of 1 g/L to 50 g/L, an aluminum concentration of 0.010 g/L to 10 g/L, an iron concentration of 0.1 g/L to 5 g/L. The lithium concentration may be, for example, 0 g/L to 7.0 g/L. The calcium concentration may be, for example, 0 g/L to 1.0 g/L.

(Neutralization Step)

The leached solution can be then subjected to a neutralization step. In the neutralization step, first, an alkali such as sodium hydroxide is added to the leached solution to neutralize it so as to have a predetermined pH. This can allow a part of aluminum dissolved in the leached solution to be precipitated. A residue containing a part of the aluminum can be removed by solid-liquid separation using a filter press, a thickener, or the like.

Here, the pH is more preferably 4.0 to 6.0. Further, the ORP value (ORPvsAg/AgCl) of the leached solution is preferably −500 mV to 100 mV. The solution temperature is preferably 50° C. to 90° C.

Subsequently, an oxidizing agent is added and a pH is adjusted to the range of 3.0 to 4.0, whereby the iron in the solution can be precipitated. The addition of the oxidizing agent oxidizes the iron in the solution from divalent iron to trivalent iron, and the trivalent iron is precipitated as an oxide or hydroxide at a pH lower than that of the divalent iron. The iron is often precipitated as a solid such as iron hydroxide ($Fe(OH)_3$). The precipitated iron can be removed by solid-liquid separation.

The ORP value during oxidation is preferably 300 mV to 900 mV in order to precipitate iron. Prior to the addition of the oxidizing agent, an acid such as sulfuric acid, hydrochloric acid and nitric acid can be added to lower the pH.

The oxidizing agent is not particularly limited as long as it can oxidize iron, and manganese dioxide can be used, for example. The manganese dioxide used as the oxidizing agent may be a reagent, or may be a cathode active material containing manganese dioxide or a manganese-containing leached residue obtained by leaching the cathode active material.

After adding the oxidizing agent, the pH can be adjusted to a predetermined range by adding an alkali such as sodium hydroxide, sodium carbonate, and ammonia.

After the neutralization step, an acidic solution is obtained as a neutralized solution. The acidic solution contains at least cobalt ions and/or nickel ions, and manganese ions and aluminum ions. The acidic solution may further contain one or more metal ions selected from the group consisting of magnesium ions, sodium ions, lithium ions and calcium ions.

For example, the acidic solution may have a cobalt concentration of 0 g/L to 50 g/L, a nickel concentration of 0 g/L to 50 g/L, and a manganese concentration of 1 g/L to 50 g/L. The aluminum concentration is preferably 0.010 g/L to 1 g/L, and more preferably 0.010 g/L to 0.5 g/L. The magnesium concentration may be, for example, 0 g/L to 0.1 g/L. The sodium concentration may be, for example, 0 g/L to 40 g/L. The lithium concentration may be, for example, 0 g/L to 7.0 g/L. The calcium concentration may be, for example, 0 g/L to 1.0 g/L.

(Al Removal Step)

After the neutralization step, an Al removal step is carried out to extract the aluminum ions in the acidic solution with a solvent to remove the aluminum ions. Here, the aluminum ions are extracted into the solvent (organic phase) while leaving the manganese ions in the acidic solution in the extracted residual liquid (aqueous phase). This allows the aluminum ions to be removed to obtain the extracted residual liquid containing at least cobalt ions and/or nickel ions and manganese ions. Here, each of the content of cobalt ions and/or the content of nickel ions in the extracted residual liquid obtained after the Al removal step, and the content of manganese ions is 80% or more, more preferably 90% or more, of the content of each ion in the neutralized solution (acidic solution), on a mass basis.

In the Al removal step, various extracting agents such as phosphate ester-based extracting agents and carboxylic acid-based extracting agents can be used as long as the manganese ions are not extracted so much and the aluminum ions are extracted, and the equilibrium pH is adjusted to an appropriate value accordingly.

Figure 2:
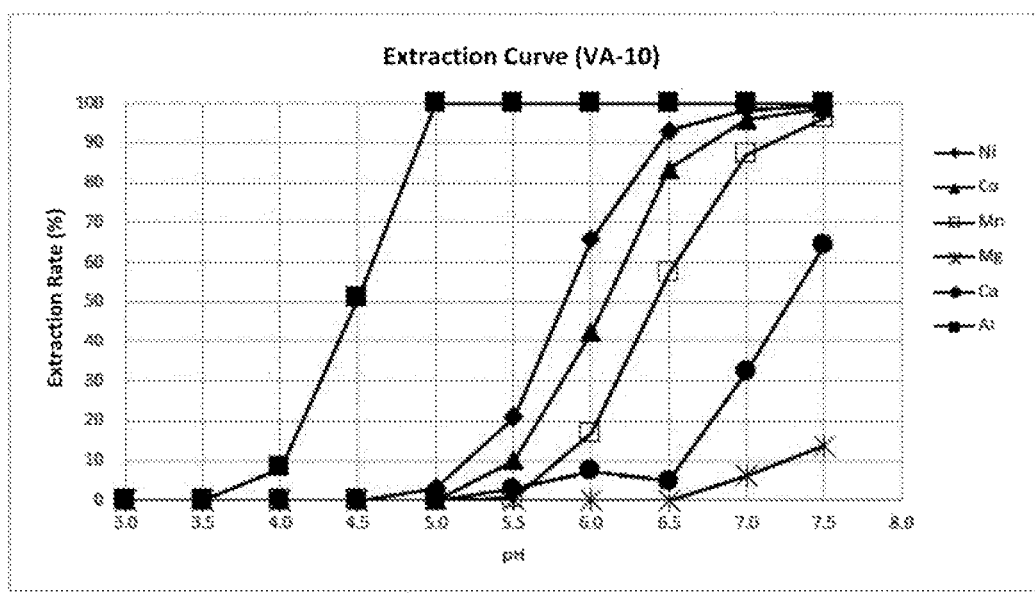
FIG. 2 is a graph showing an example of an extraction curve representing a relationship between an extraction rate of each metal and a pH in extraction using a solvent containing a carboxylic acid-based extracting agent (VA-10).

Examples of the carboxylic acid-based extracting agents that can be used in the Al removal step include neodecanoic acid and naphthenic acid. Among them, neodecanoic acid is preferable in view of extracting the aluminum ions while extracting manganese ions as little as possible. The carboxylic acid-based extracting agent preferably contains a carboxylic acid having 8 to 16 carbon atoms. Specifically, Versatic Acid 10 (also referred to as "VA-10") from Shell Chemicals can be used. In this case, the equilibrium pH during extraction is preferably 4.0 to 5.0, and more preferably 4.3 to 4.7. If the equilibrium pH is too low, the aluminum ions may not be sufficiently extracted into the solvent and a large number of aluminum ions may remain in the acidic solution. On the other hand, if the equilibrium pH is too high, aluminum is hydroxylated to form solid aluminum hydroxide, which cannot be extracted by the solvent. In addition, as can be seen from FIG. 2, there is a risk that the cobalt ions, nickel ions and manganese ions are extracted into the solvent. When this equilibrium pH is brought using the solvent containing the carboxylic acid-based extracting agent, most of the cobalt ions and/or nickel ions and manganese ions can be remained in the extracted residual liquid (aqueous phase) while removing substantially all of the aluminum ions. Here, FIG. 2 shows a graph created by subjecting the acidic solution having the composition shown in Table 1 to multiple extraction tests having different equilibrium pH conditions where the equilibrium pH is changed in the range of pH 3.0 to pH 7.5 using a solvent containing VA-10 as an extracting agent, and plotting an extraction rate (which is calculated based on the amount of each metal in the acidic solution in Table 1 and the amount of each metal remaining in the extracted liquid) of each metal obtained in each of these extraction tests.

TABLE 1

|  | Ni | Co | Mn | Mg | Ca | Al |
|---|---|---|---|---|---|---|
| Concentration (g/L) | 31.36 | 9.98 | 10.38 | 0.0164 | 0.45 | 0.49 |

When the extracting agent is used, it is typically diluted with a hydrocarbon-based organic solvent to form a solvent. Examples of the organic solvent include aromatic, paraffinic, and naphthenic solvents. For example, the concentration of the phosphate ester-based extracting agent in the solvent may be 20% to 30% by volume, and the concentration of the carboxylic acid-based extracting agent in the solvent may be 20% to 30% by volume. However, it is not limited thereto. It should be noted that the O/A ratio may be 1.0 to 5.0.

The above extraction can be carried out based on a general technique. As an example, a solution (aqueous phase) and a solvent (organic phase) are brought into contact with each other, and stirred and mixed, typically by a mixer, for 5 to 60 minutes to allow the ions to react with the extracting agent. The temperature during extraction is from normal temperature (about 15 to 25° C.) to 60° C. or less, and the extraction is preferably carried out at 35 to 45° C. for reasons of extraction speed, phase separation, and evaporation of the organic solvent. Subsequently, the mixed organic phase and aqueous phase are separated from each other by a settler based on a difference in specific gravity. Extraction in the metal extraction step, which will be described below, can also be carried out in practically the same manner.

The extracted residual liquid obtained after the Al removal step as described above may have, for example, a cobalt concentration of 0 g/L to 50 g/L, a nickel concentration of 0 g/L to 50 g/L, a manganese concentration of 1 g/L to 50 g/L, and an aluminum concentration of 0.001 g/L or less.

(Precipitation Step)

In the precipitation step, the extraction residual liquid obtained in the above Al removal step is neutralized under conditions where the pH is less than 10.0, and mixed metal salts containing each metal salt of cobalt and/or nickel and manganese are precipitated. In this case, the mixed metal salts will be obtained in the precipitation step immediately after the Al removal step, and it is not necessary to carried out solvent extraction after the Al removal step. On the other hand, for example, when, after the Al removal step, a metal extraction step of extracting and back-extracting two or three metals of cobalt and/or nickel and manganese is carried out and the precipitation step is then carried out, it will be necessary to use a pH adjusting agent such as sodium hydroxide. When compared with such a case, this embodiment can suppress an increase in cost caused by the use of the pH adjusting agent. Moreover, in this embodiment, any contamination of the mixed metal salts with impurities can be suppressed, as will be described below.

The extracted residual liquid (pre-neutralization liquid) is an acidic aqueous solution such as sulfuric acid having a pH of about 2.5 to 5.0. In the precipitation step, an alkali is added to such an extracted residual liquid to neutralize it so that the pH of the extracted residual liquid is preferably 9.0 or more, and more preferably 9.5 or more. If the pH is too low, each metal salt of cobalt and/or nickel and manganese may not be sufficiently precipitated. However, the pH should be less than 10.0. If the pH is 10.0 or more, the magnesium ions, calcium ions, and the like, which may be contained in the extracted residual liquid, may also be precipitated and contained in the mixed metal salts. From this point of view, the pH is preferably 9.8 or less.

If the acidic solution or extracted residual liquid also contains one or more metal ions selected from the group consisting of magnesium ions, sodium ions, lithium ions and calcium ions, the pH is preferably adjusted as described above to leave at least one of such metal ions in the liquid without precipitating it. This can lead to improvement of the purity of the mixed metal salts.

Examples of the alkali added to the extracted residual liquid in the precipitation step include sodium hydroxide, ammonia and the like. In particular, the use of sodium hydroxide is preferable, because the pH can be adjusted by a small amount of sodium hydroxide. When sodium hydroxide is added to the extracted residual liquid, cobalt and/or nickel and a part of manganese are precipitated as hydroxides, respectively. In this case, the mixed metal salts contain cobalt hydroxide and/or nickel hydroxide and manganese hydroxide.

The mixed metal salts as the neutralized residue obtained by the subsequent solid-liquid separation contains mixed metal salts of cobalt and/or nickel and manganese, such as cobalt hydroxide and/or nickel hydroxide and manganese hydroxide. Further, the neutralized residue may contain oxides of each metal, $Co_3O_4$, $Mn_3O_4$, $Mn_2O_3$, $Ni_3O_4$, and the like.

The neutralized residue as described above may optionally be washed with water or the like, and then dissolved in a sulfuric acid solution, and it is heated and concentrated, or cooled to obtain mixed metal salts containing cobalt sulfate and/or nickel sulfate and manganese sulfate.

The mixed metal salts containing hydroxides or sulfates of cobalt and/or nickel and manganese as described above may have, for example, a cobalt content of 0% by mass to 60% by mass, a nickel content of 0% by mass to 60% by mass, and a manganese content of 1% to 60% by mass. The mixed metal salts preferably have a sodium content of 60 ppm by mass or less, a calcium content of 10 ppm by mass or less, and a magnesium content of 10 ppm by mass or less, as impurities other than cobalt, nickel and manganese.

Such mixed metal salts can be easily recovered at a lower cost than each metal of cobalt, nickel and manganese, and may be preferably used for the production of lithium ion batteries.

EXAMPLES

The method for producing the mixed metal salts as described above was experimentally conducted and its effects were confirmed as described below. However, the description herein is merely for the purpose of illustration and is not intended to be limited thereto.

For 43.4 mL of an acidic solution having the composition shown in Table 2, 217 mL of a solvent containing VA-10 was used as an extracting agent (extraction solvent 51) to set the equilibrium pH to 5.0, and aluminum was extracted and removed. The concentration of VA-10 in the solvent was 25% and the O/A ratio was 1.0. Here, most of the nickel ions, cobalt ions and manganese ions were not extracted, and most of the aluminum ions were extracted. Table 2 shows an extraction rate calculated from the concentration of each metal in the acidic solution and the concentration of each metal in the extracted residual liquid (extracted residual liquid L1), and the content of each metal in the acidic solution and the content of each metal in the extracted residual liquid (extracted residual liquid L1). 100% of the aluminum ions were extracted. On the other hand, the extraction rate of nickel ions was 11%, the extraction rate of cobalt ions was 9%, and the extraction rate of manganese ions was 9%, all of which could be maintained at about 10%. In this test, it was conducted using a separating funnel, but in operation, it can be expected that the extraction can be carried out in a countercurrent manner at multiple stages, so that aluminum ions can be extracted, but the nickel ions, cobalt ions, and manganese ions cannot be extracted.

TABLE 2

|  |  | Ni | Co | Mn | Mg | Ca | Al | Liquid Volume (ml) |
|---|---|---|---|---|---|---|---|---|
| Acidic Solution | Concentration (g/L) | 30.070 | 9.910 | 10.380 | 0.051 | 0.420 | 0.480 | 43.4 |
|  | Mass (g) | 1.305 | 0.430 | 0.450 | 0.002 | 0.018 | 0.021 |  |
| Extracted Residual Liquid L1 | Concentration (g/L) | 26.390 | 8.940 | 9.380 | 0.053 | 0.420 | 0.001 | 43.9 |
|  | Mass (g) | 1.159 | 0.392 | 0.412 | 0.002 | 0.018 | 0.000 |  |
| Extraction Rate (%) |  | 11 | 9 | 9 | −5 | −1 | 100 |  |

Next, sodium hydroxide was added to the solution (pre-neutralization liquid) having the composition as shown in Table 3 to neutralize it so that the pH of the pre-neutralization solution was adjusted to 9.0. The precipitate thus precipitated was separated from the liquid by filtration. Table 3 shows the concentration of each metal in the pre-neutralization liquid and the neutralized filtrate and the recovery rate calculated from these values, and Table 4 shows the composition (purity) of the precipitate. As a result, 88% of magnesium ions and 98% of calcium ions could be removed by neutralization, 100% of nickel and cobalt could be recovered in the precipitate, and 77% of manganese could also be recovered. Manganese hydroxide generated in the neutralization step is precipitated by increasing the pH, so it would be possible to further improve the recovery rate, for example by increasing the pH to 9.5 or more. At this time, as described above, if the pH is 10.0 or more, the Ca metal salt tends to be precipitated, so that the pH should be less than 10.0.

TABLE 3

|  |  | Ni | Co | Mn | Mg | Ca | Al | Liquid Volume (ml) |
|---|---|---|---|---|---|---|---|---|
| Pre-Neutralization Liquid | Concentration (g/L) | 31.090 | 10.220 | 10.460 | 0.019 | 0.450 | 0.000 | 200.0 |
|  | Mass (g) | 6.218 | 2.044 | 2.092 | 0.004 | 0.090 | 0.000 |  |
| Neutralized Filtrate | Concentration (g/L) | 0.022 | 0.015 | 2.050 | 0.014 | 0.380 | 0.000 | 233.2 |
|  | Mass (g) | 0.005 | 0.003 | 0.478 | 0.003 | 0.089 | 0.000 |  |
| Recovery Rate (%) |  | 100 | 100 | 77 | 12 | 2 | 0 |  |

TABLE 4

|  |  | Ni | Co | Mn | Mg | Ca | Al | Mass (g-dry) |
|---|---|---|---|---|---|---|---|---|
| Precipitate | Purity (%) | 39.000 | 13.000 | 11.000 | 0.006 | 0.089 | 0.000 | 15.7 |
|  | Mass (g) | 6.123 | 2.041 | 1.727 | 0.001 | 0.014 | 0.000 |  |

It was confirmed from the above results that the acidic solution was processed in the above steps, whereby the total amount of aluminum contained in the acidic solution could be removed, and about 90% of nickel ions, cobalt ions, and manganese ions could be recovered into the filtrate (mixed metal salts).

The invention claimed is:

1. A method for producing mixed metal salts comprising manganese ions and at least one of cobalt ions and nickel ions, the method comprising:
    an Al removal step of subjecting an acidic solution comprising at least manganese ions and aluminum ions, and at least one of cobalt ions and nickel ions, to removal of the aluminum ions by extracting the aluminum ions into a solvent, the acidic solution is obtained by subjecting battery powder of lithium ion batteries to a leaching step; and
    a precipitation step of neutralizing an extracted residual liquid obtained in the Al removal step under conditions where a pH is less than 10.0, to precipitate mixed metal salts comprising a metal salt of manganese and a metal salt of at least one of cobalt and nickel,
    wherein a metal extraction step of extracting and back-extracting at least one of cobalt, nickel and manganese is not carried out between the Al removal step and the precipitation step.

2. The method for producing mixed metal salts according to claim 1, wherein, in the precipitation step, sodium hydroxide is used for neutralization of the extracted residual liquid, and the mixed metal salts comprises a hydroxide of manganese and a hydroxide of at least one of cobalt hydroxide and nickel hydroxide.

3. The method for producing mixed metal salts according to claim 1,
    wherein the acidic solution further comprises one or more metal ions selected from the group consisting of magnesium ions, sodium ions, lithium ions and calcium ions, and
    wherein, in the precipitation step, the metal ions are left in the liquid without precipitating the metal ions.

4. The method for producing mixed metal salts according to claim 1, wherein, in the precipitation step, a pH of the extracted residual liquid is adjusted to 9.0 or more.

5. The method for producing mixed metal salts according to claim 1, wherein, in the Al removal step, a solvent containing a carboxylic acid-based extracting agent is used to adjust an equilibrium pH to 4.0 to 5.0.

6. The method for producing mixed metal salts according to claim 1, wherein, in the Al removal step, at least 80% or more of the manganese ions in the acidic solution and at least 80% or more of at least one of the cobalt ions and the nickel ions, on a mass basis, are left in an aqueous phase.

\* \* \* \* \*